United States Patent
Saghari et al.

(10) Patent No.: US 11,967,994 B1
(45) Date of Patent: Apr. 23, 2024

(54) OPTICAL TRANSCEIVER

(71) Applicant: Amazon Technologies, Inc., Seattle, WA (US)

(72) Inventors: Poorya Saghari, San Jose, CA (US); Alaa Adel Mahdi Hayder, Sammamish, WA (US); Omid Momtahan, Palo Alto, CA (US); Venkata Satish Kumar Vangala, San Jose, CA (US); Aliasghar Eftekhar, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/490,973

(22) Filed: Sep. 30, 2021

(51) Int. Cl.
  *H04B 10/03*  (2013.01)
  *H04B 10/079*  (2013.01)
  *H04B 10/25*  (2013.01)
  *H04B 10/40*  (2013.01)
  *H04J 14/02*  (2006.01)
  *H04Q 11/00*  (2006.01)

(52) U.S. Cl.
  CPC ......... *H04B 10/40* (2013.01); *H04B 10/0793* (2013.01); *H04B 10/25* (2013.01); *H04J 14/0227* (2013.01); *H04Q 11/0005* (2013.01); *H04Q 11/0067* (2013.01); *H04Q 2011/0039* (2013.01)

(58) Field of Classification Search
  CPC .............................. H04B 10/40; H04B 10/03
  See application file for complete search history.

(56) References Cited

U.S. PATENT DOCUMENTS

| | | | | |
|---|---|---|---|---|
| 6,731,879 B1 * | 5/2004 | Frisch | ................... | H04B 10/032 398/178 |
| 7,174,096 B2 * | 2/2007 | Berthold | ............. | H04J 14/0294 398/1 |
| 9,021,130 B1 * | 4/2015 | Sahay | ................... | H04L 49/552 709/239 |
| 9,225,454 B1 * | 12/2015 | Liu | ......................... | H04J 14/02 |
| 9,432,445 B1 * | 8/2016 | Leonard | .............. | H04L 67/1008 |

(Continued)

OTHER PUBLICATIONS

IPhoneGalaxyMD, tweet Jul. 15, 2020 (Year: 2020).*

(Continued)

*Primary Examiner* — Shi K Li
(74) *Attorney, Agent, or Firm* — Klarquist Sparkman, LLP

(57) ABSTRACT

An optical transceiver includes a built-in optical switch to switch between diverse fiber paths in switches in a datacenter or in switches between two datacenters. The built-in optical switch can be used to switch between racks in a datacenter to increase capacity for any rack that requests it. A controller, which receives a signal from a server computer in one of the racks, can be external to the optical transceiver or within the optical transceiver. In either case, the server computer can be provided with additional bandwidth when needed. For connections between datacenters, the built-in optical switch allows for optical line protection, but without the need for a splitter circuit, which incurs a significant power loss and requires a more expensive transceiver. Consequently, the built-in optical switch within an optical transceiver can be used in a variety of contexts to increase efficiency and reduce overall costs for network devices.

9 Claims, 7 Drawing Sheets

(56) References Cited

U.S. PATENT DOCUMENTS

| | | | | |
|---|---|---|---|---|
| 9,654,853 | B2* | 5/2017 | Mehrvar | H04Q 11/0066 |
| 11,238,428 | B1* | 2/2022 | Nagarajan | G06Q 20/36 |
| 11,342,997 | B1* | 5/2022 | Haylock | H04J 14/02 |
| 2010/0309777 | A1* | 12/2010 | Kano | H04L 47/10 |
| | | | | 370/218 |
| 2012/0099863 | A1* | 4/2012 | Xu | H04Q 11/0005 |
| | | | | 398/48 |
| 2014/0270762 | A1* | 9/2014 | Li | H04L 45/02 |
| | | | | 398/45 |
| 2015/0125158 | A1* | 5/2015 | El-Ahmadi | H04L 1/0041 |
| | | | | 398/135 |
| 2021/0373236 | A1* | 12/2021 | Jiang | G02B 6/43 |
| 2022/0214980 | A1* | 7/2022 | Tanaka | G06F 13/4282 |
| 2023/0033577 | A1* | 2/2023 | Shah | H04L 12/44 |

OTHER PUBLICATIONS

Chi et al., "Experimental Characteristics of Optical Crosspoint Switch Matrix and Its Applications in Optical Packet Switching", Journal of Lightwave Technology, vol. 24, No. 10, Oct. 2006 (Year: 2006).*

* cited by examiner

OPTICAL TRANSCEIVER

BACKGROUND

Large computer networks are often used in cloud computing or other applications and may contain hundreds or thousands of network devices of several types, such as switches, routers, and hubs. Data from a source endpoint (e.g., a host computer or a network device connecting to another network) travels to a destination endpoint via paths defined by links between multiple devices of the network.

An optical module is used to transform electrical signals at endpoints and switches to optical signals and vice versa. An optical transceiver may include a laser as the light source, a modulator for encoding an electrical signal on an optical carrier and a photo detector as a receiver to transform optical signals back to the electrical signal. An optical link includes separate transmit and receive optical paths/fibers and connects one or multiple connectors to the optical transceiver.

Redundancy in an optical network avoids service interruptions and network outages and provides high quality of service network in the case of possible link failure, optical module failure, and network device or port failure. A design of the datacenter network redundancy based on a trade-off between the network availability and additional required hardware that needs to be included in the network is useful to develop a cost-effective datacenter network with high network availability. In conventional networks with fixed/static optical links, a substantial switch port redundancy at switch level is required to accommodate for possible switch, link, switch port, and optical module failure as well the fluctuation in the traffic load of each switch.

DETAILED DESCRIPTION

Figure 1:
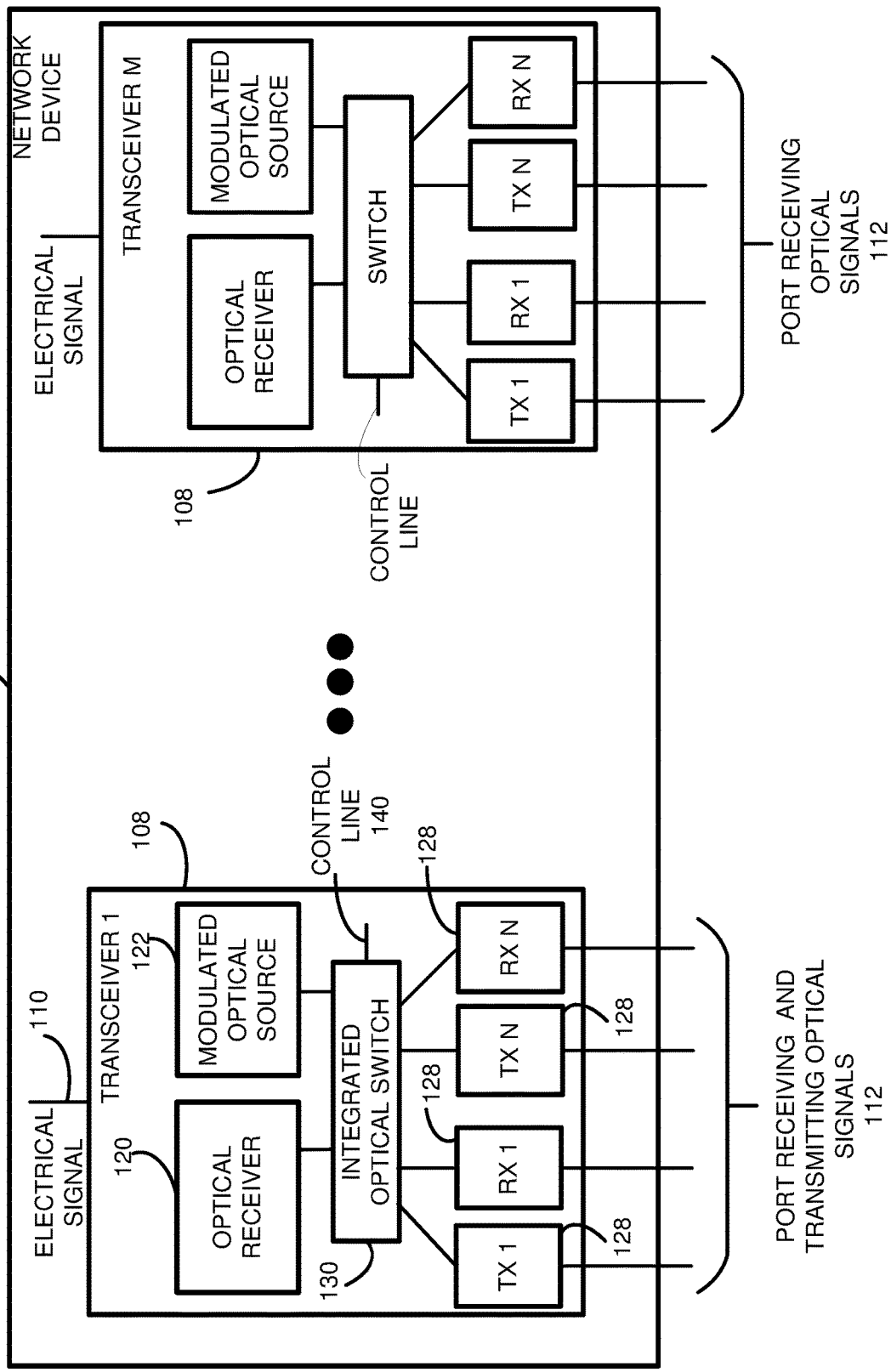
FIG. 1 is an exemplary network device including multiple transceivers according to one embodiment.

As demand for cloud services increases, datacenter users also require higher service level agreement (SLA) standards, which necessitates higher network availability and smaller network defects. To maintain high availability, redundant optical links can be used to maintain network coverage in the events of optical link loss, network port/optical module failure, or networking switch failures. Optimization of network configuration, workflow and mitigation approach in the case of a network device failure or link fault is desirable to maintain/maximize the link availability, while minimizing the impact of the added redundancy on the network performance and coverage and the network cost.

One embodiment includes a redundant optical network based on dynamic optical link switching and additional link-level redundancy, which can potentially reduce the number of the required redundant switch ports for the same link availability target. An optical module is incorporated with built-in redundancy and two distinct sets of optical links, which allows for switching the traffic between the two redundant optical links, without imposing any penalty on the link power budget or the network performance. Such a redundant schema allows for alternative link paths between two switch ports in the network, or alternatively, for connecting each switch port on each side of the link to two distinct switch ports of the same switch or on two different network devices.

To increase efficiency, a built-in optical switch in an optical transceiver is used to switch between diverse fiber paths in switches in a datacenter or in switches used to connect two datacenters. If one of the fiber paths fails, the other can be used to support capacity. In an alternative configuration, when the two fiber paths are connected to two different network devices, such redundancy can switch the traffic from a network device or a switch port/optical module in case of the network device failure and allow for network connectivity through the alternative switch route. Additionally, the built-in optical switch can be used to switch between racks in a datacenter to increase network capacity for any rack that requests it. For example, a server computer in a rack can signal that it needs capacity for a large data transfer, and the built-in optical switch can be used to prioritize the rack including the server computer. A controller that receives a signal from the server computer can be external to the network switch or within the network switch. In either case, the server computer can be provided with additional networking bandwidth when needed. For connections between datacenters, the built-in optical switch allows for optical line protection, but without the need for a splitter circuit; such a circuit incurs a significant power loss, and may lead to constraints in the network reach/coverage or the need for more expensive transceivers. Consequently, the built-in optical switch within an optical transceiver can be used in a variety of contexts to increase efficiency and reduce overall costs for network devices. The envisioned redundant optical module is based on adding a diverse path or a switch on the module Rx and Tx path to allow switching between two or more fiber links connected to the fiber. In one example the built-in optical switch can be integrated into a Silicon photonics (SiPho) chip, which enables adding a switch with minimal optical power penalty.

FIG. 1 is an example network device 100 having multiple transceivers, shown generally at 108. The transceivers 108 are labeled from 1 to M, where M is any integer number, and each transceiver represents a port on the network device 100. The transceivers can have any form factor, such as Small Form-Factor Pluggable (SFP), Octal Small Format Pluggable (OSFP), etc. The network device can be any device that forwards data and includes switches (multilayer or single-layer), routers, repeaters, gateways, network bridges, hubs, etc. Generally, the transceivers 108 convert data between electrical signal lines 110 and optical signal lines 112. Each transceiver 108 can have a similar structure, so only a transceiver labeled transceiver 1 is discussed for simplicity. The transceivers 108 can be pluggable in and out of the network device 100 to create ports on the network devices into which optical cables can plug. The transceiver 1 includes an optical receiver 120, such as a photodetector, which receives optical signals and converts the optical signals on the optical signal lines 112 to electrical signals for transmission over the electrical signal lines 110. The transceiver 1 further includes a modulated optical source 122, such as a laser, that converts the electrical signals received on the electrical signal lines 110 to optical signals for transmission over the optical signal lines 112. Other modulated optical sources can be used, such as a coherent receiver or a direct detect receiver.

The optical signal lines 112 include different optical line pairs (labeled 1 through N, where N is any integer number), and only one of the pairs is active at a point in time. Each optical line pair includes a transmit line (TX) and a receive line (RX) coupled to the transceiver 108 through connectors 128. Because there are multiple optical line pairs, there are at least four optical lines entering the transceiver when N is equal to two. A switch 130 controls which of the optical pairs is coupled to the optical receiver 120 and the modulated optical source 122. The switch 130 is controlled by a control line 140, which switches the switch to couple selected optical line pairs to the optical receiver 120 and the modulated optical source 122. The switch 130 can be integrated into a SiPho integrated circuit, a lithium niobate integrated circuit, etc. The switch can include a Mach-Zehnder modulator (MZM).

Figure 2:
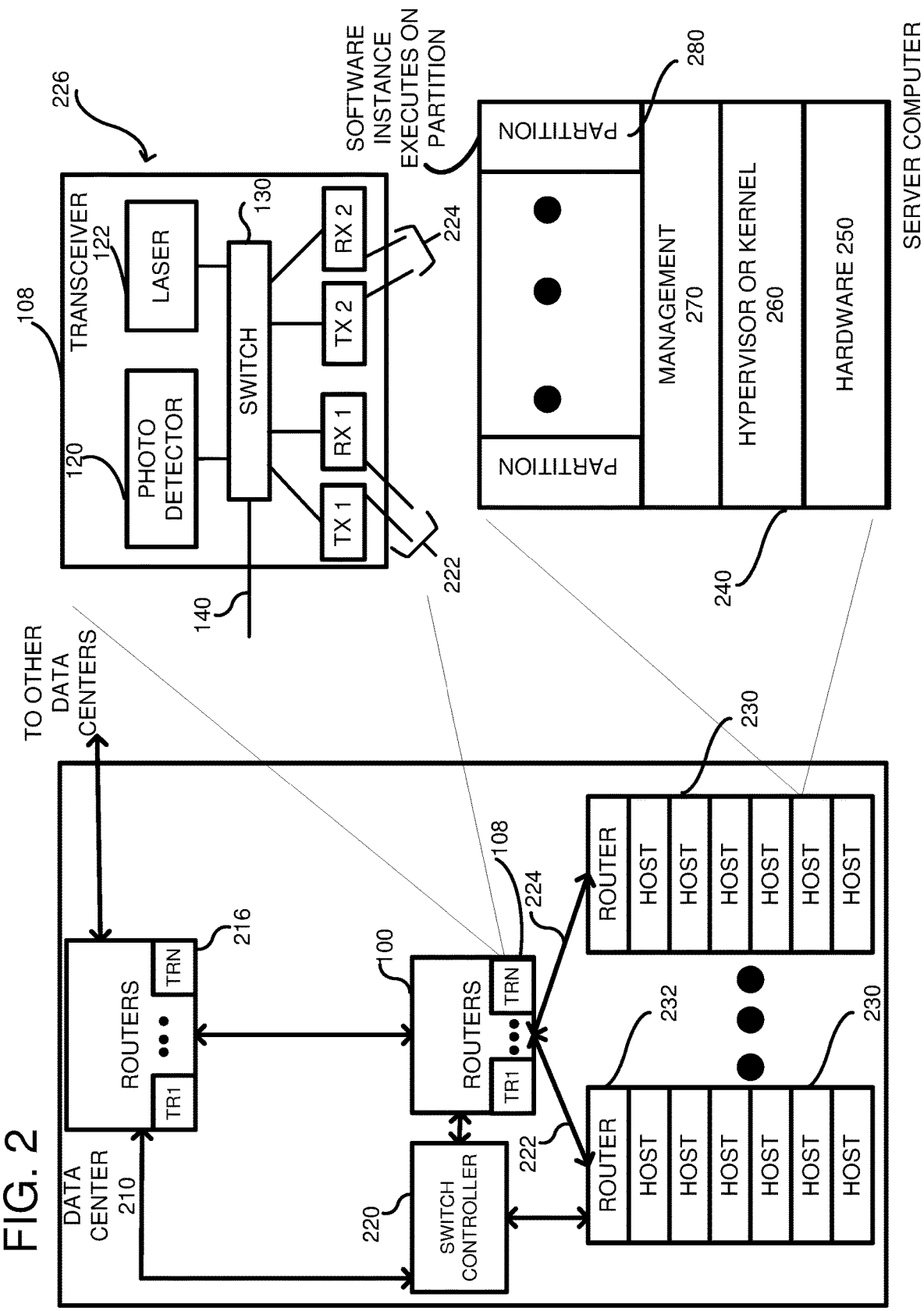
FIG. 2 is an exemplary datacenter including the transceivers of FIG. 1, with a switch controller positioned external to the transceivers.

FIG. 2 illustrates a datacenter 210 and how the transceivers 108 can be used to more efficiently move data through a datacenter network. The datacenter 210 can be one of a plurality of data centers coupled together by routers 216. The routers 216 read address information in a received packet and determine the packet's destination. If the router decides that a different data center contains a host server computer, then the packet is forwarded to that data center. If the packet is addressed to a host in the data center 210, then it is passed to additional layers of routers within the data center 210, such as routers 100. The routers 100 are shown having ports formed by the transceivers 108. A switch controller 220 can be a server computer and is coupled to the control line 140 (FIG. 1) of the transceivers 108. Although not shown, each transceiver 108 in the routers 100 can be independently controlled by the switch controller 220. Two different optical pairs 222, 224 are shown coupled to different racks 230. The two optical pairs 222, 224 can be coupled to a single transceiver 108, such as is shown in the expanded view 226, with one optical pair 222 coupled to TX1/RX1 and one optical pair 224 coupled to TX2/RX2. The switch controller 220 can control which optical pair 222, 224 is active and coupled to the photodetector 120 and laser 122.

Each rack 230 can include a network switch 232 (sometimes called a "top-of-rack switch") coupled to multiple host server computers. A particular host server computer is shown in an expanded view at 240. Each host 240 has underlying hardware 250 including one or more CPUs, memory, storage devices, etc. Running a layer above the hardware 250 is a hypervisor or kernel layer 260. The hypervisor or kernel layer can be classified as a type 1 or type 2 hypervisor. A type 1 hypervisor runs directly on the host hardware 250 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 670 can be part of the hypervisor or separated therefrom and generally includes device drivers needed for accessing the hardware 250. The partitions 280 are logical units of isolation by the hypervisor. Each partition 280 can be allocated its own portion of the hardware layer's memory, CPU allocation, storage, etc. Additionally, each partition can include a virtual machine and its own guest operating system. As such, each partition is an abstract portion of capacity designed to support its own virtual machine independent of the other partitions. An application executing on the partition 280 can request additional bandwidth from the switch controller 220. Thus, at any point in time, the switch controller 220 can respond to a request from one of the hosts 230 in a rack to activate optical lines 222 or optical lines 224 depending on the rack in which the requesting host is operating. It should be understood that although the transceiver 108 is shown switching between different racks 230, the transceiver 108 can also be used to switch other network layers. The host server computers in the racks 230 can be coupled to the switch controller 220 through the switches 232 or through a separate cable (not shown). In a similar fashion, routers between router layers can perform similar functionality. For example, the switch controller 220 can be coupled to routers in other network layers, such as the routers 216. And the routers 100 can request the switch controller 220 to provide additional bandwidth for particular ports.

Although FIG. 2 shows TX/RX lines coupled to different racks, an optical module (one switch port) can be connected to the same or different switch ports. Thus, a same port can have redundant connections to a switch port on a different network device.

Figure 3:
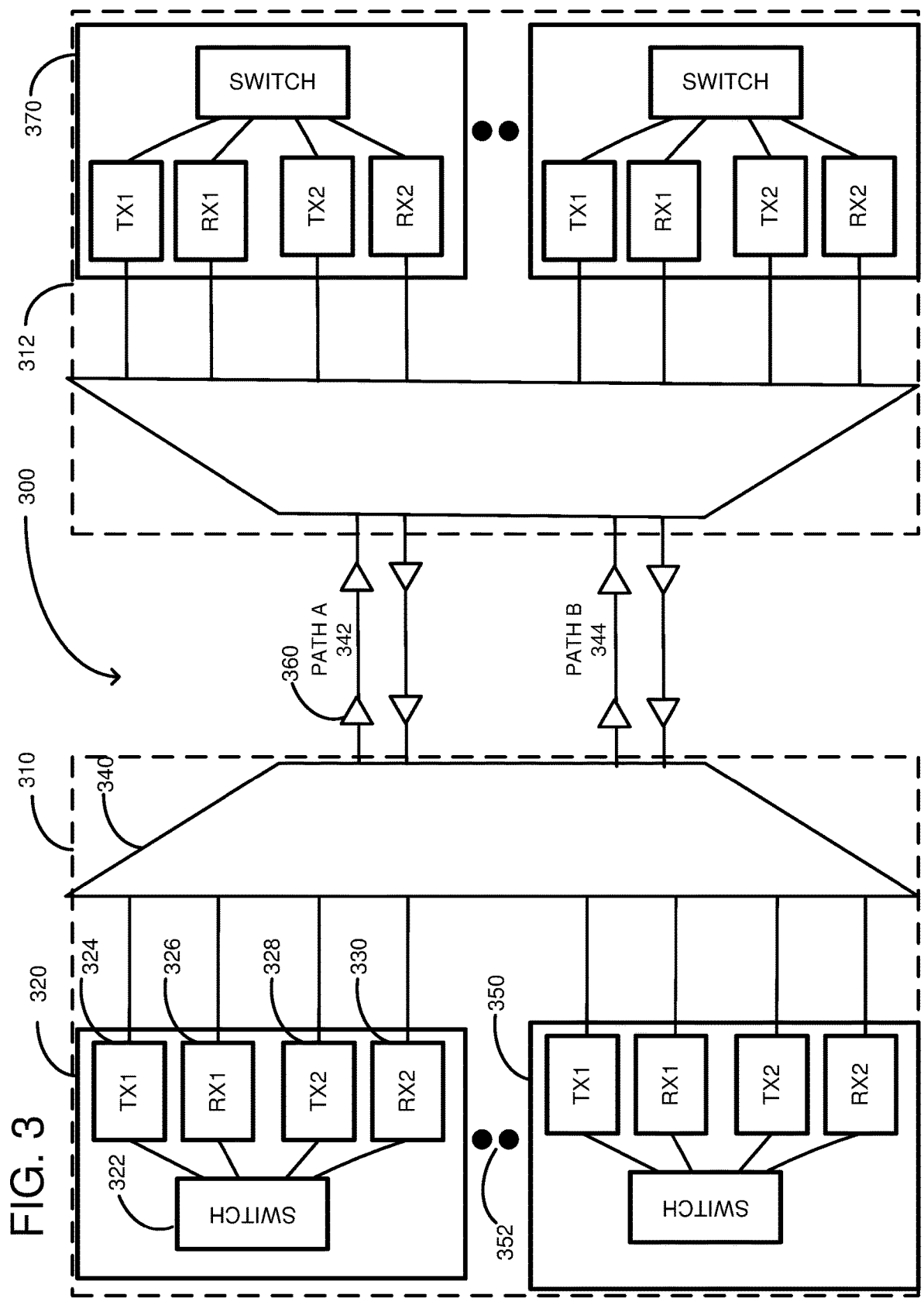
FIG. 3 is an example of the transceivers of FIG. 1 being used for optical line protection.

FIG. 3 shows a network 300 for coupling together geographically distant datacenters, shown by dashed lines 310, 312. Although shown as datacenters, they can be dense wavelength-division multiplexing (DWDM) optical systems. The datacenters 310, 312 include many edge routers, but only some transceivers associated with the edge routers are shown for simplicity. A transceiver 320 includes a switch 322 coupled to a first pair of transmission lines including a transmission line (TX1) 324 and a receive line (RX1) 326 and a second pair of transmission lines including transmission line (TX2) 328 and a receive line (RX2) 330. The switch 322 couples optical signals from TX1 324 and RX1 326 to a modulated optical source (e.g., laser) and an optical receiver (e.g., photodetector)(not shown) in a first mode of operation. In the first mode of operation, the transmission line (TX2) 328 and receive line (RX2) 330 are deactivated and cannot communicate with the modulated optical source and receiver. In a second mode of operation, the switch 322 deactivates lines TX1 324 and RX1 326 and activates lines TX2 328 and RX2 330 such that the activated lines are coupled to the modulated optical source and the photodetector. Additional transceivers, such as transceiver 350, have the same architecture as transceiver 320. As indicated by dots 352, there are any number of transceivers in the datacenter 310. A multiplexer/demultiplexer 340 switches between which transceiver is coupled to the Path A, shown at 342, or Path B, shown at 344. Path A 342 is a primary path and Path B is a redundant path and only one of Path A or Path B is active at a point in time. For example, Path A 342 can be a primary path and transceiver 320 and transceiver 350 use TX1 to transmit on Path A. However, if Path A 342 is disrupted (e.g., cut), then the transceivers 320, 350 can switch to TX2 and RX2 and the multiplexer 340 switches the signals onto Path B 344. The paths A and B can have booster amplifiers therein, such as is shown at 360.

Datacenter 312 has a similar structure to datacenter 310. The switching between Path A and Path B has been traditionally implemented with a splitter circuit coupled to both paths, and the splitter circuit has a significant operational loss in power. Using the switches, such as switch 322, internal to the transceivers at both ends of Path A and Path B allows the splitter circuit to be eliminated. For example, communications between transceiver 320 and 370 on opposite ends of optical Path A 342 and Path B 344 can communicate on either path without a splitter circuit while still providing optical line protection.

Figure 4:
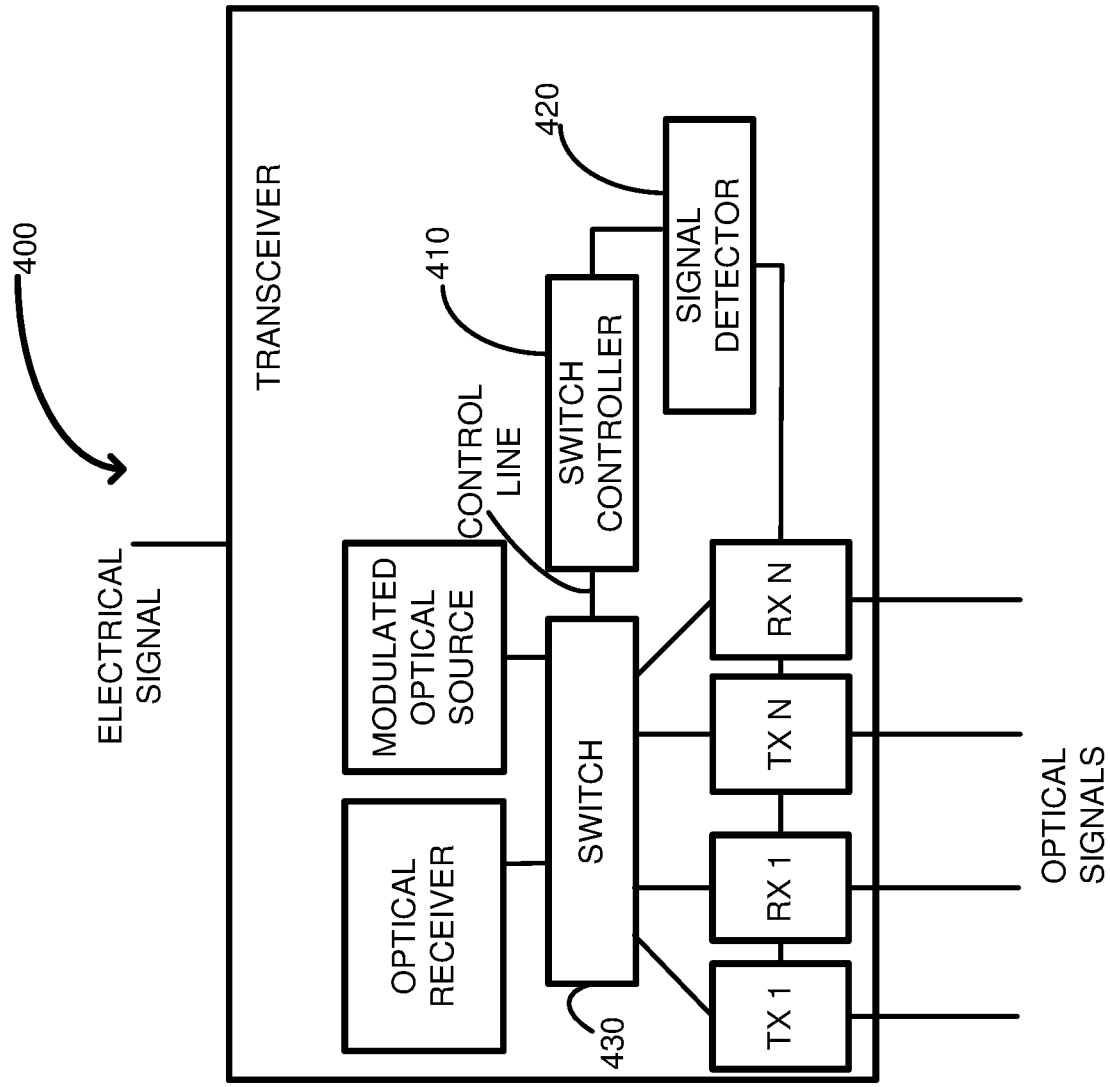
FIG. 4 is an example transceiver including an embedded switch controller.

FIG. 4 is an embodiment of a transceiver 400 with a switch controller 410 within the transceiver. The switch controller is responsive to a signal detector 420 that is coupled to the TX/RX signal lines and detects when one of the lines fails. For example, the signal detector 420 can include a photodetector that determines that the light signals are insufficient on one or more of the TX/RX signal lines. The signal detecting can be based upon tapping the TX/RX signals or an inline monitor. In response, the signal detector 420 can alert the switch controller 410, which can, in turn, modify the mode of a switch 430. For example, if the signal detector 420 detects that there is no signal on TX1/RX1, it can alert the switch controller 410. The switch controller 410 can then switch active lines from TX1/RX1 to one of the other TX/RX pairs in the transceiver. Thus, a control line to the switch 430 can be controlled by an internal switch controller 410, as in FIG. 4, or an external switch controller as shown in FIG. 2.

Figure 5:
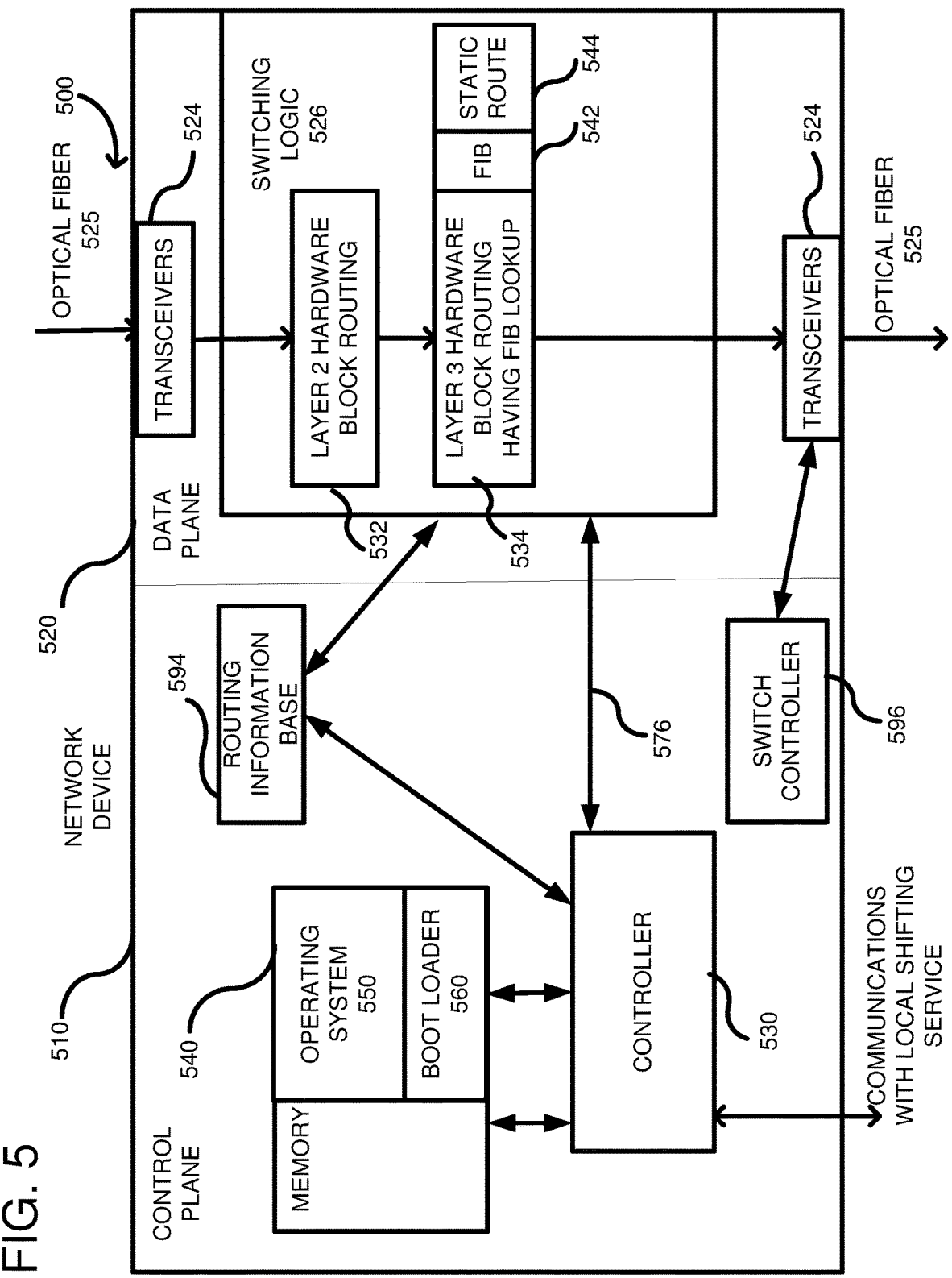
FIG. 5 is an exemplary router including the transceivers described herein.

FIG. 5 is an embodiment of the network device 500 that is used for forwarding packets to neighbor network devices. The network device 500 includes a control plane 510 and a data plane 520. The control plane 510 is generally a management layer for configuring, updating, and controlling the data plane 520. The control plane includes a controller 530, which can be a Central Processing Unit (CPU), processor, application-specific integrated circuit (ASIC), microcontroller, or any hardware logic that can receive packets and provide switch management and control in response thereto. The controller 530 has access to a memory 540 that can be a Dynamic Random-Access Memory (DRAM), Flash memory, or other type of RAM or ROM. The memory 540 is used to store an operating system 550 for the network device 500. The memory 540 may also include a boot loader program 560, which is a first program executed after a reboot of the controller 530, and which can run basic hardware tests before booting up the operating system 550. Although a single memory is shown, the memory 540 can be divided into multiple memories and even memories of different types. A communications bus 576 allows communications between the controller 530 and the data plane 520. The communications bus 576 can be any desired bus type, such as PCI, PCIe, AGP, etc. The data plane 520 includes input ports and output ports 524 used for receiving and sending network packets, respectively. One or more of the input ports and output ports 524 can be transceivers for receiving and sending optical signals on optical fiber 525. The transceivers 524 can have the structure described in FIGS. 1-4.

Switching logic 526 is positioned between the input ports and the output ports 524. The switching logic 526 can be a single ASIC integrated circuit or divided into multiple integrated circuits. The switching logic 526 can include multiple different hardware logic blocks including a Layer 2 hardware block 532 and a Layer 3 hardware block 534. The layer 2 hardware block 532 relates to an Ethernet layer and can forward packets based on MAC tables. The layer 3 hardware block 534 relates to forwarding based on a longest prefix match of an IP address. Layer 3 typically involves a route lookup, decrementing the Time-To-Live (TTL) count, calculating a checksum, and forwarding the frame with the appropriate MAC header to the correct output port. The route lookup of the layer 3 hardware can include searching within a Forwarding Information Base (FIB) 542, which includes destination addresses for packets being transmitted through the switching logic. A programmed static route 544 can have priority over the FIB and can be used by the controller 530 to program the switching logic 526 and change the next hop to a different hop than is indicated in the FIB 542. The network device 500 can run routing protocols, such as an Open Shortest Path First (OSPF) or a Routing Information Protocol (RIP), to communicate with other Layer 3 switches or routers. Whether it be the FIB or the static routes, the layer 3 hardware is used to lookup the route for an incoming packet. The different hardware blocks can be coupled in series and additional hardware blocks can be added based on the design.

The transceivers 524 can be pluggable and removable from the network device 500. Each transceiver 524 can be a port in the network device 500 and can receive at least two pairs of optical wires for the different TX/RX pairs, although only one of the pairs is active at any time. A switch controller 596 can be positioned within the network device 500 and can be used to control the transceivers 524 similar to the switch controller 220 (FIG. 2) and 410 (FIG. 4).

Figure 6:
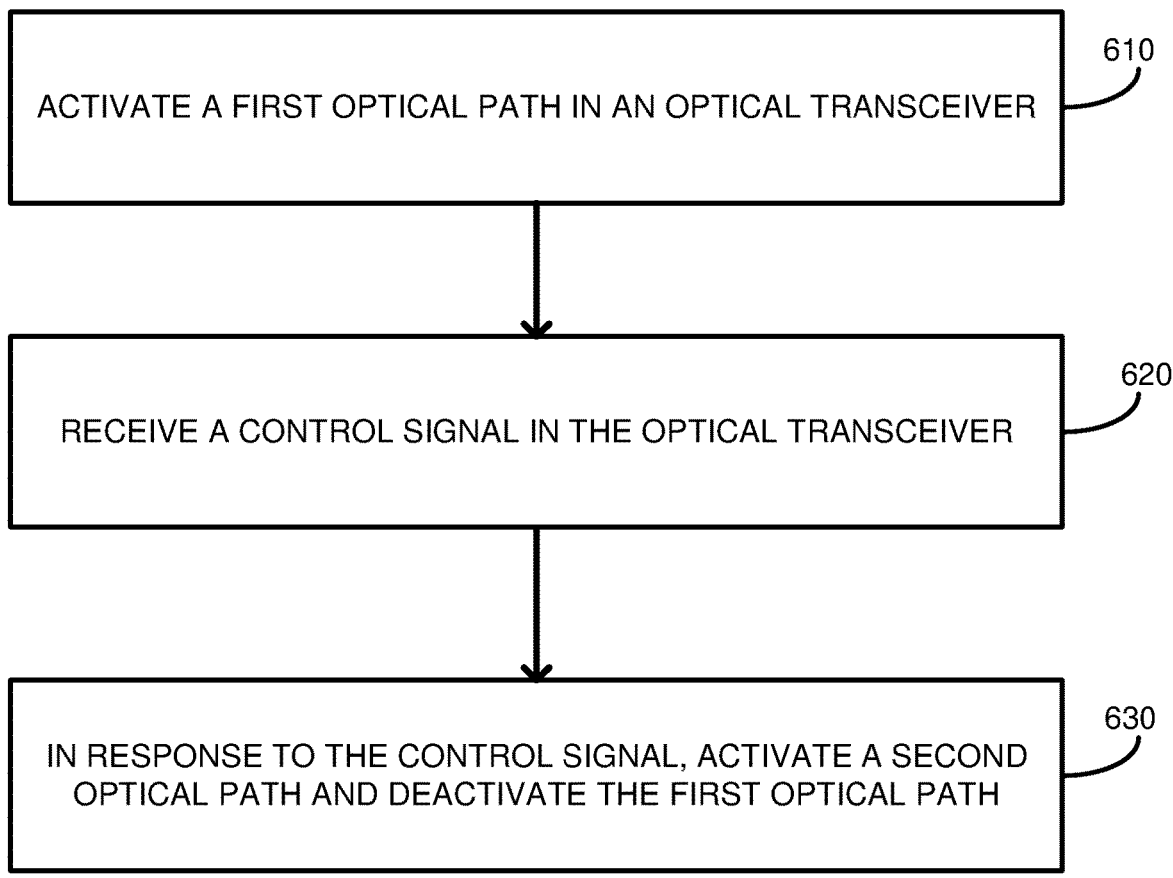
FIG. 6 is a flowchart according to one embodiment for operating the transceivers described herein.

FIG. 6 is a flowchart according to one embodiment for implementing an optical transceiver. In process block 610, a first optical path is activated in an optical transceiver. For example, in FIG. 1, the first optical path can include TX1 and RX1 as a combination transmit/receive path. In process block 620, a control signal is received in the optical transceiver. In FIG. 1, the control signal can be received on the control line 140. The source of the control signal can be an external server computer, such as the switch controller 220 in FIG. 2 or an internal controller within the transceiver, as shown in FIG. 4 as the switch controller 410. In process block 630, in response to the control signal, a second optical path is activated and the first optical path is deactivated. For example, in FIG. 1, in response to the control line 140, the switch 130 can switch from TX1/RX1 to a different transmitter/receiver pair. In one particular example, a first side of an optical link detects an RX signal drop below a threshold level. As a result, the TX/RX redundant lines are used (a second side). The second side can detect the drop of the signal and switches to a standby link. A link monitoring signal is then sent on the main link, which is acting as a new standby link.

Figure 7:
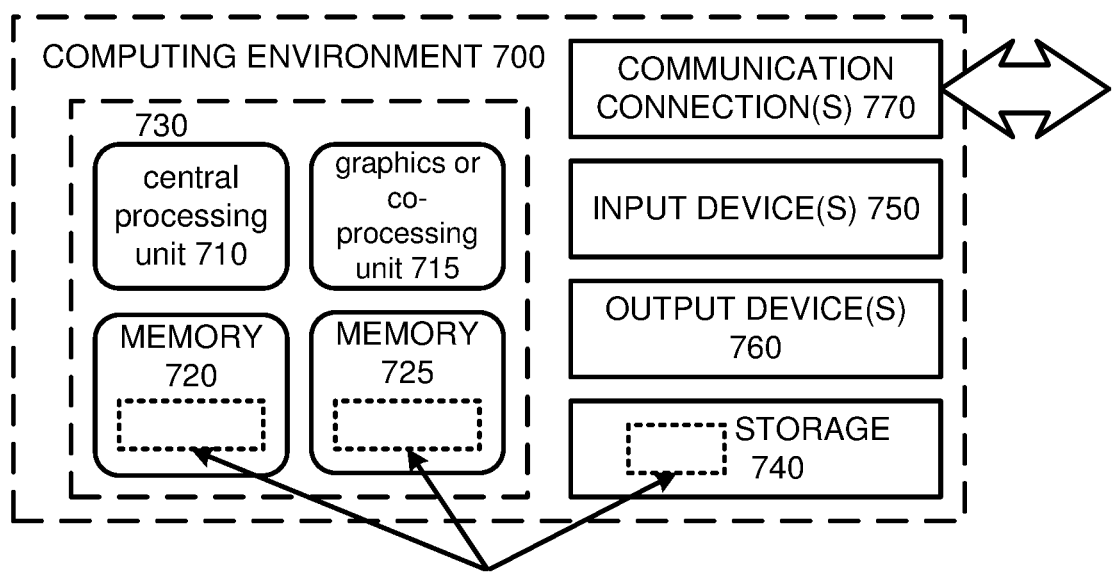
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.).

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700. The computing environment 700 can be used as the switch controller 220, for example.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A datacenter network configuration, comprising:
a first rack including a first plurality of server computers;
a second rack including a second plurality of server computers;
a network device including an optical transceiver, wherein the optical transceiver is coupled to both the first rack and second rack using optical cables plugged into a port of the optical transceiver; and the optical transceiver including a switch coupled to the port for switching between the first rack and second rack in response to a control signal;

wherein the control signal in the optical transceiver is configured to switch the optical transceiver to the second rack after receiving a request from a server computer in the second rack for additional bandwidth.

2. The datacenter of claim 1, wherein the control signal is received from a switch controller, which is external to the optical transceiver and coupled to the first and second racks.

3. The datacenter of claim 1, wherein the control signal is received from a switch controller, which is within the optical transceiver.

4. The datacenter of claim 1, wherein the network device is a router and wherein the optical transceiver is pluggable into the router.

5. The datacenter of claim 1, wherein the optical transceiver is integrated into a silicon photonics integrated circuit or a lithium niobate integrated circuit.

6. A method of switching optical paths in an optical transceiver, comprising:

activating a first optical path including a first transmission line and a first receive line coupled to a connector in the optical transceiver;

receiving a control signal in the optical transceiver to switch from the first optical path to a second optical path, wherein the second optical path includes a second transmission line and a second receive line coupled to the connector in the optical transceiver; and in response to the control signal, activating the second optical path and deactivating the first optical path;

wherein the first optical path is a primary path and the second optical path is a redundant path;

wherein the first optical path is coupled to a first server rack and the second optical path is coupled to a second server rack, wherein the activating of the second optical path occurs in response to receiving a request from a server computer in the second server rack for additional bandwidth.

7. The method of claim 6, wherein the optical transceiver is plugged into a router in a network.

8. The method of claim 6, wherein the optical transceiver includes a laser and a photodetector.

9. The method of claim 6, wherein the optical transceiver is within a network device and wherein the control signal is controlled from a server computer coupled to the network device.

* * * * *